United States Patent
Imai et al.

(10) Patent No.: US 8,367,757 B2
(45) Date of Patent: Feb. 5, 2013

(54) POLYMER COMPOSITE MATERIAL, OPTICAL MATERIAL INCLUDING THE SAME, AND THERMOPLASTIC AROMATIC POLYMER

(75) Inventors: Yusuke Imai, Tosu (JP); Atsushi Terahara, Tosu (JP)

(73) Assignee: National Institute of Advanced Industrial Science Technology, Tokyo (JP)

(*) Notice: Subject to any disclaimer, the term of this patent is extended or adjusted under 35 U.S.C. 154(b) by 284 days.

(21) Appl. No.: 12/812,841

(22) PCT Filed: Nov. 25, 2008

(86) PCT No.: PCT/JP2008/071345
§ 371 (c)(1),
(2), (4) Date: Jul. 14, 2010

(87) PCT Pub. No.: WO2009/090799
PCT Pub. Date: Jul. 23, 2009

(65) Prior Publication Data
US 2011/0046285 A1 Feb. 24, 2011

(30) Foreign Application Priority Data
Jan. 17, 2008 (JP) .................................. 2008-7919

(51) Int. Cl.
*C08K 3/10* (2006.01)
(52) U.S. Cl. ...................................................... 524/413
(58) Field of Classification Search .................... 524/413
See application file for complete search history.

(56) References Cited

U.S. PATENT DOCUMENTS

| | | | |
|---|---|---|---|
| 5,221,727 A * | 6/1993 | Kumpf et al. ................. | 528/128 |
| 2002/0114977 A1 | 8/2002 | Kubota et al. | |
| 2005/0191492 A1 * | 9/2005 | Yadav ........................... | 428/407 |

FOREIGN PATENT DOCUMENTS

| | | |
|---|---|---|
| JP | 06273949 A | 9/1994 |
| JP | 09-208813 | 8/1997 |
| JP | 2001-323146 | 11/2001 |
| JP | 2001348477 A | 12/2001 |
| JP | 2002047425 A | 2/2002 |
| JP | 2002507644 A | 3/2002 |
| JP | 2002-269728 | 9/2002 |
| JP | 2002284975 A | 10/2002 |
| JP | 2003073558 A | 3/2003 |
| JP | 2003-186221 | 7/2003 |
| JP | 2003261329 A | 9/2003 |
| JP | 2003322982 A | 11/2003 |
| JP | 2004-010688 | 1/2004 |
| JP | 2005121933 A | 5/2005 |
| JP | 2007129748 A | 5/2007 |
| WO | 9948962 A1 | 9/1999 |
| WO | 2007129748 A1 | 11/2007 |

OTHER PUBLICATIONS

Japanese Office Action issued Jan. 26, 2012 in corresponding Japanese Patent Application No. 2008-007919.
PCT/ISA/210, WO, Mar. 10, 2009, ISR for PCT/JP2008/071345.
PCT/ISA/237, WO, Mar. 10, 2009, Written Opinion for PCT/JP2008/071345.
Hakuta et al., Effect of water denstiy on polymorph of BaTio3 nanoparticles synthesized under sub and supercritical water conditions, Materials Letters, vol. 59, 2005, 1387-1390.

\* cited by examiner

*Primary Examiner* — Doris Lee
(74) *Attorney, Agent, or Firm* — Edwards Wildman Palmer LLP; David G. Conlin; Weiying Yang

(57) ABSTRACT

The present invention develops a new thermoplastic aromatic polymer in which metal oxide particles can be uniformly dispersed even without any special functional group in the polymer, and provides a high-performance polymer composite material including the thermoplastic aromatic polymer. A polymer composite material of the present invention includes: a polymer matrix including a thermoplastic aromatic polymer having both an ester bond and an ether bond; and metal oxide particles dispersed in the polymer matrix.

12 Claims, No Drawings

POLYMER COMPOSITE MATERIAL, OPTICAL MATERIAL INCLUDING THE SAME, AND THERMOPLASTIC AROMATIC POLYMER

This application is the U.S. National Phase Application, pursuant to 35 U.S.C. §371, of PCT/International Application Serial No. PCT/JP2008/071345, filed Nov. 25, 2008, which claims the benefit of Japanese Patent Application No. 7919/2008, filed Jan. 17, 2008. The entire contents of the aforementioned applications are incorporated herein by reference in their entirety.

TECHNICAL FIELD

The present invention relates to a polymer composite material including metal oxide particles dispersed in a polymer matrix; an optical material including the polymer composite material; and a thermoplastic aromatic polymer. In particular, the present invention relates to a polymer composite material including as a polymer matrix an aromatic polymer having both an ester bond and an ether bond.

BACKGROUND ART

In recent years, so-called polymer composite materials (nanocomposites), which are respectively nanoscale composites of metal oxide particles with polymers, have been under research and development because polymer composite materials may be able to express unconventional and characteristic physical properties. In particular, a polymer composite material including metal oxide particles having a particle diameter ranging from 1 nm to 100 nm can exhibit unconventional physical properties. Polymer composite materials are thus expected to be used in various applications, e.g., for an optical material, an electronic material, a coating material, a gas barrier material, and a photocatalyst.

With regard to the application for, e.g., an optical material, research has been conducted on how to uniformly disperse highly refractive metal oxide particles in a transparent polymer, the metal oxide particles having a primary particle diameter sufficiently smaller than a wavelength of visible light, because uniform dispersion of such metal oxide particles will not impair visible light transmissivity. The above dispersion, if achieved, can bring about production of a polymer composite material which not only has a high transparency and a high moldability, but also has a high refractive index unachievable with a resin solely.

As one of the above researches it has been studied to produce a transparent and highly refractive polymer composite material by including, as the above metal oxide particles, highly refractive metal oxide particles such as titanium oxide particles and zirconium oxide particles so as to form a composite of such metal oxide particles with a thermosetting resin or a photo-curable resin.

However, a polymer composite material including a thermosetting resin or a photo-curable resin as a polymer matrix is extremely limited in terms of, e.g., a composite forming method and a molding method.

In view of this, research has been conducted on a polymer composite material including a thermoplastic resin as a polymer matrix, which is a medium in which metal oxide particles are to be dispersed. The use of a thermoplastic resin makes it possible to select one from among a variety of generally used molding methods such as injection molding, as appropriate according to intended use of the polymer composite material.

Metal oxide particles can be dispersed in a thermoplastic resin by, e.g., a method involving use of a dispersing agent or a surface treatment agent.

One specific example of the polymer composite material including a thermoplastic resin as a polymer matrix is a polymer composite material including metal oxide particles dispersed in a polyimide (see, for example, Patent Literature 1).

However, the polymer composite material disclosed in Patent Literature 1 includes a polyimide having a high melting temperature and metal oxide particles. The polymer composite material hence has a high melting temperature. This makes it difficult to mold this polymer composite material by a generally used molding method such as injection molding.

Another known polymer composite material includes a polymer and ultrafine metal oxide particles each having a particle diameter ranging from 1 nm to 100 nm and having a surface modified with either an acidic group or a combination of an acidic group and a basic group (see, for example, Patent Literature 2). According to Patent Literature 2, the metal oxide particles can be dispersed in a thermoplastic polymer containing an electron-donating group. Specifically, Patent Literature 2 teaches the following technique: A thermoplastic resin containing an electron-donating group is used a polymer matrix. Metal oxide particles to be used each have a surface modified with either an acidic group or a combination of an acidic group and a basic group by use of an organic modifier. The metal oxide particles are dispersed in the polymer matrix by means of electron transfer to trap sites on the surfaces of the metal oxide particles, thus producing a nanocomposite.

Another known method for producing a transparent and highly refractive polymer composite material is a method which improves compatibility between metal oxide particles and a polymer. A known example of the method is a method in which a functional group capable of covalently bonding with both metal oxide particles and a polymer is introduced so that the metal oxide particles are bonded with the polymer (see, for example, Patent Literature 3).

Citation List
  Patent Literature 1
    Japanese Patent Application Publication, Tokukai, No. 2001-348477 A (Publication Date: Dec. 18, 2001)
  Patent Literature 2
    Japanese Patent Application Publication, Tokukai, No. 2003-73558 A (Publication Date: Mar. 12, 2003)
  Patent Literature 3
    Japanese Patent Application Publication, Tokukai, No. 2002-47425 A (Publication Date: Feb. 12, 2002)
  Patent Literature 4
    Japanese Patent Application Publication, Tokukai, No. 2003-261329 A (Publication Date: Sep. 16, 2003)
  Non Patent Literature 1
    Yukiya Hakuta, Haruo Ura, Hiromichi Hayashi, Kunio Arai, "Effect of water density on polymorph of $BaTiO_3$ nanoparticles synthesized under sub and supercritical water conditions", Materials Letters 59, p. 1389-1390 (2005).

SUMMARY OF INVENTION

The above conventional techniques are, however, problematic in that a transparent and highly refractive polymer composite material cannot be produced in a case where metal oxide particles are dispersed in a generally used thermoplastic aromatic polymer such as an aromatic polyether, an aromatic polyester, and an aromatic polycarbonate.

Specifically, feasibility was tested of the invention of Patent Literature 2, with the following result: In a case where generally used aromatic polymers other than a copolymer of bisphenol-A and epichlorohydrin were used, the metal oxide particles were agglomerated. It was thus impossible to uniformly disperse the metal oxide particles. Thus, the use of a thermoplastic aromatic polymer as a polymer matrix hence made it difficult to produce a transparent and highly refractive polymer composite material.

In the case where (i) a functional group capable of bonding with metal oxide particles or (ii) an acidic group such as a sulfonate group and a phosphonate group is introduced into a polymer, synthesis is complicated and, in addition, properties characteristic of the polymer may be impaired.

Thus, a polymer composite material has not been found which (i) includes metal oxide particles uniformly dispersed in a polymer matrix made of a generally used thermoplastic aromatic polymer containing no special functional group and which thus (ii) has a high moldability, a high transparency, and a high refractive index.

The present invention has been accomplished in view of the above conventional problem. It is an object of the present invention to (i) develop a new thermoplastic aromatic polymer in which metal oxide particles can be uniformly dispersed even without any special functional group in the polymer, and to (ii) provide a high-performance polymer composite material including the thermoplastic aromatic polymer.

In order to solve the above problem, the inventors of the present invention have conducted diligent research on a thermoplastic aromatic polymer in which metal oxide particles can be uniformly dispersed. The inventors have consequently found that in a case where a thermoplastic aromatic polymer having both an ester bond and an ether bond is used as a polymer matrix, the dispersibility of metal oxide particles is significantly high as compared to a case where a thermoplastic aromatic polymer having only either an ester bond or an ether bond is used as a polymer matrix. The inventors have thus arrived at the present invention.

Specifically, in order to solve the above problem, a polymer composite material of the present invention includes: a polymer matrix including a thermoplastic aromatic polymer having both an ester bond and an ether bond; and metal oxide particles dispersed in the polymer matrix.

According to the present invention, a thermoplastic aromatic polymer having both an ester bond and an ether bond is used as a polymer matrix. This enables production of a polymer composite material which includes metal oxide particles uniformly dispersed in a polymer matrix made of a generally used thermoplastic aromatic polymer having no special functional group in the polymer, and which has a high transparency and a high refractive index.

Additional objects, features, and strengths of the present invention will be made clear by the description below.

DESCRIPTION OF EMBODIMENTS

The following describes the best mode for carrying out the present invention. A polymer composite material of the present invention includes metal oxide particles dispersed in a polymer matrix made of a thermoplastic aromatic polymer having both an ester bond and an ether bond.

The ester bond is of, e.g., a carboxylic acid ester, a phosphonic acid ester, or a carbonic acid ester. Among these esters, the carboxylic acid ester or the phosphonic acid ester is preferably used because each of them produces a great effect of dispersing particles. The phosphonic acid ester is preferably a phenylphosphonic acid diester.

The ether bond is of, e.g., an oxygen- or sulfur-bonded (thio)ether. The ether bond is preferably formed with an oxygen atom.

The ester bond and the ether bond may be either in a main chain of the polymer or in a side chain thereof. For example, one of the ether bond and the ester bond is formed in the main chain of the polymer, while the other of them is formed in the side chain of the polymer. Each of the above bonds may be introduced in the side chain either as a substituent group or as a graft copolymer. Alternatively, both the ether bond and the ester bond are preferably formed in the main chain of the polymer.

Some preferable examples of the thermoplastic aromatic polymer having both an ester bond and an ether bond in the main chain are (i) an aromatic polyester having an ether bond in its repeating unit and (ii) a block copolymer including an aromatic polyester segment and an aromatic polyether segment.

The following description first deals with the aromatic polyester (thermoplastic aromatic polymer) having an ether bond in its repeating unit. The aromatic polyester having an ether bond in its repeating unit takes various forms. Preferable among such forms is a copolymer of aromatic polyalylate including an aromatic diol residue and an aromatic dicarboxylic acid residue in which copolymer a percentage N, calculated from Equation 1 below, of the repeating unit represented by General Formula (1) is not less than 20 mol % but less than 60 mol %, $$N = n_1/(n_1 + n_2) \times 100 \qquad \text{(Equation 1)},$$

where $n_1$ is a number of moles in the repeating unit represented by General Formula (1); and $n_2$ is a number of moles in the repeating unit represented by General Formula (2). The above copolymer is preferable because its materials can be obtained and synthesized easily.

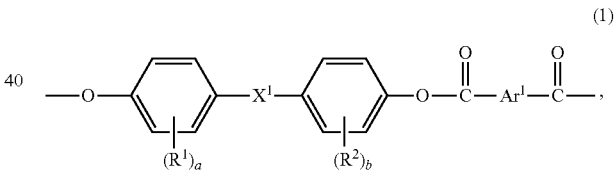

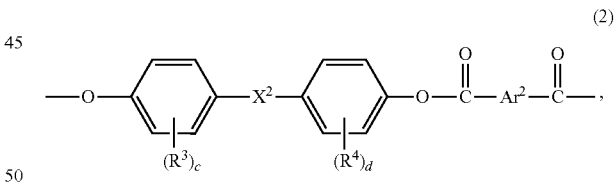

where $R^1$, $R^2$, $R^3$, and $R^4$ are independently a halogen atom, an alkyl group having 1 to 6 carbon atoms, or an aryl group having 6 to 12 carbon atoms, and may be identical to or different from one another; a, b, c, and d are independently an integer(s) of 0 to 4; $X^1$ is an oxygen atom or a sulfur atom; $X^2$ is a single bond, an alkylene group having 1 to 6 carbon atoms or an alkylidene group having 1 to 6 carbon atoms, a cycloalkylene group having 5 to 20 carbon atoms or a cycloalkylidene group having 5 to 20 carbon atoms, a 9,9-fluorenylidene group, a hexafluoro-2,2-propylidene group, —SO—, —SO$_2$—, or —CO—; and $Ar^1$ and $Ar^2$ are independently a phenylene group, naphthylene group, or biphenylene group, and are substituted or unsubstituted.

In the description of the thermoplastic aromatic polymer of the present invention, the aromatic diol residue refers to an aromatic diol whose hydroxyl group(s) has no hydrogen atom. Similarly, the aromatic dicarboxylic acid residue refers to an aromatic dicarboxylic acid whose carboxyl group(s) has no hydroxyl group.

More specifically, the aromatic diol residue having a (thio) ether bond and represented in General Formula (1) may be a residue formed from, e.g., 4,4'-dihydroxy dipheny ether; 4,4'-dihydroxy-3,3'-dimethyl dipheny ether; 4,4'-dihydroxy-3,3', 5,5'-tetramethyl dipheny ether; bis(4-hydroxyphenyl)sulfide; bis(4-hydroxy-3-methyl phenyl)sulfide; or bis(4-hydroxy-3, 5-dimethyl phenyl)sulfide.

Among the above, a residue of 4,4'-dihydroxy dipheny ether is particularly preferable because the residue can be produced easily and is high in heat resistance and moldability.

More specifically, the aromatic diol residue having no (thio)ether bond and represented in General Formula (2) may be a residue formed from, e.g., (i) an aromatic diol such as 4,4'-dihydroxy biphenyl; 4,4'-dihydroxy-3,3'-dipheny biphenyl; and 9,9-bis(4-hydroxyphenyl)florene, (ii) a bis(hydroxyaryl)alkane such as 2,2-bis(4-hydroxyphenyl)propane; 2,2-bis(4-hydroxy-3-methyl phenyl)propane; 2,2-bis(4-hydroxy-3,5-dimethyl phenyl)propane; 2,2-bis(4-hydroxy-t-butyl phenyl)propane; and 2,2-bis(4-hydroxy bromophenyl) propane, (iii) a bis(hydroxyaryl)cycloalkane such as 1,1-bis (4-hydroxyphenyl)cyclopentane; and 1,1-bis(4-hydroxyphenyl)cyclohexane, (vi) a dihydroxyaryl sulfoxide such as 4,4'-dihydroxy dipheny sulfoxide; and 4,4'-dihydroxy-3,3'-dimethyl phenyl sulfoxide, or (v) a dihydroxyaryl sulfone such as 4,4'-dihydroxy dipheny sulfone; and 4,4'-dihydroxy-3,3'-dimethyl phenyl sulfone.

Among the above, 2,2-bis(4-hydroxyphenyl)propane (bisphenol-A) is particularly preferable because it can be produced easily and is high in heat resistance, moldability, and transparency. The above aromatic dihydroxy compounds may be used either individually or in combination.

The repeating unit having a (thio)ether bond and represented by General Formula (1) is preferably not less than 20 mol % but less than 60 mol % relative to 100 mol % of the thermoplastic aromatic polymer. If the repeating unit is less than 20 mol %, the metal oxide particles may be low in dispersibility. If the repeating unit is not less than 60 mol %, the polyalylate copolymer may be low in transparency, heat resistance, and solubility in organic solvent. The copolymerization percentage is more preferably not less than 30 mol % but not more than 50 mol %.

More specifically, the aromatic dicarboxylic acid residue represented in General Formulae (1) and (2) may be a residue formed from, e.g., terephthalic acid; isophthalic acid; 2,6-naphthalene dicarboxylic acid; or 4,4'-biphenyl dicarboxylic acid. Particularly preferable is a polyalylate made of a binary mixture of terephthalic acid and isophthalic acid in which binary mixture the isophthalic acid is not less than 10 mol % but not more than 90 mol %. Such a polyalylate is preferable because it is high in heat resistance, moldability, transparency, and solubility in organic solvent.

The aromatic polyalylate copolymer (thermoplastic aromatic polymer) of the present embodiment preferably has a weight-average molecular weight of not less than 5000 but not more than 500 000, or more preferably not less than 10 000 but not more than 200 000. If the molecular weight is less than 5000, a resulting polymer composite material may produce a molding which is low in strength. If the molecular weight is more than 500 000, a resulting polymer composite material may be high in viscosity and thus impede molding.

The aromatic polyalylate copolymer can be easily produced by a publicly known method. For example, an aromatic diol having a (thio)ether bond, an aromatic diol having no (thio)ether bond, and aromatic dicarboxylic acid dichloride can be reacted with one another in the presence of a base to synthesize the aromatic polyalylate copolymer.

The following describes the block copolymer including an aromatic polyester segment and an aromatic polyether segment.

Both the aromatic polyester segment and the aromatic polyether segment take various structural forms. The block copolymer obtained by combining them hence takes various forms as well.

As the aromatic polyester segment, an aromatic polyalylate segment represented by General Formula (3) below is particularly preferable because the aromatic polyalylate segment is high in heat resistance, moldability, transparency, and solubility in organic solvent.

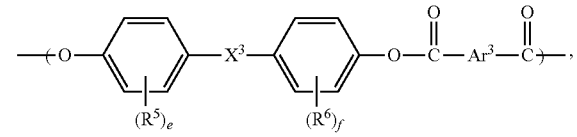

where $R^5$ and $R^6$ are independently a halogen atom, an alkyl group having 1 to 6 carbon atoms, or an aryl group having 6 to 12 carbon atoms, and may be identical to or different from one another; e and f are independently an integer(s) of 0 to 4; $X^3$ is a single bond, an alkylene group having 1 to 6 carbon atoms, an alkylidene group having 1 to 6 carbon atoms, a cycloalkylene group having 5 to 20 carbon atoms, a cycloalkylidene group having 5 to 20 carbon atoms, a 9,9-fluorenylidene group, a hexafluoro-2,2-propylidene group, —O—, —S—, —SO—, —SO$_2$—, or —CO—; and $Ar^3$ is a phenylene group, naphthylene group, or biphenylene group, and is substituted or unsubstituted.

Specific examples of an aromatic diol residue and an aromatic dicarboxylic acid residue represented in General Formula (3) are the residues exemplified in General Formulae (1) and (2).

Particularly, a polyalylate segment including bisphenol-A and tere/isophthalic acid is preferable because the polyalylate segment can be produced easily and is high in heat resistance, moldability, and transparency.

As the aromatic polyether segment in the block copolymer including an aromatic polyester segment and an aromatic polyether segment, an aromatic polyether represented by General Formula (4), (5), or (6) below is preferable because the aromatic polyether has an excellent capability to disperse the metal oxide particles, and is also high in heat resistance, moldability, transparency, and solubility in organic solvent.

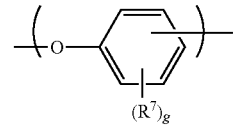

where $R^7$ is a halogen atom, an alkyl group having 1 to 6 carbon atoms, or an aryl group having 6 to 12 carbon atoms, and may be identical to or different from each other; and g is an integer of 0 to 4.

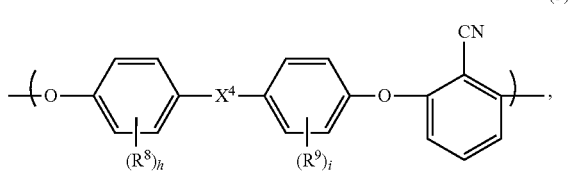

(5)

where $R^8$ and $R^9$ are independently a halogen atom, an alkyl group having 1 to 6 carbon atoms, or an aryl group having 6 to 12 carbon atoms, and may be identical to or different from one another; h and i are independently an integer(s) of 0 to 4; and $X^4$ is a single bond, an alkylene group having 1 to 6 carbon atoms, an alkylidene group having 1 to 6 carbon atoms, a cycloalkylene group having 5 to 20 carbon atoms, a cycloalkylidene group having 5 to 20 carbon atoms, a 9,9-fluorenylidene group, a hexafluoro-2,2-propylidene group, —O—, —S—, —SO—, —SO$_2$—, or —CO—.

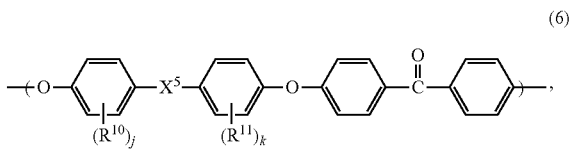

(6)

where $R^{10}$ and $R^{11}$ are independently a halogen atom, an alkyl group having 1 to 6 carbon atoms, or an aryl group having 6 to 12 carbon atoms, and may be identical to or different from one another; k and j are independently an integer(s) of 0 to 4; and $X^5$ is a single bond, an alkylene group having 1 to 6 carbon atoms, an alkylidene group having 1 to 6 carbon atoms, a cycloalkylene group having 5 to 20 carbon atoms, a cycloalkylidene group having 5 to 20 carbon atoms, a 9,9-fluorenylidene group, a hexafluoro-2,2-propylidene group, —O—, —S—, —SO—, —SO$_2$—, or —CO—.

The aromatic polyether represented by General Formula (4) is a residue of monovalent phenol. A specific example of the residue is a residue of, e.g., phenol; o-cresol; m-cresol; 2,6-dimethyl phenol; 2,5-dimethyl phenol; 2,3,6-trimethyl phenol; 2-ethyl phenol; 2-phenyl phenol; 2,6-diphenyl phenol; salicylic acid; methyl salicylate; ethyl salicylate; 2-hydroxy-3-methylbenzoic acid; 2-hydroxy-3-methylbenzoic acid methyl ester; or 2-hydroxy-3-methylbenzoic acid ethyl ester.

Particularly preferable is a segment of either poly(2,6-dimethyl phenylene ether) produced from 2,6-dimethyl phenol or poly(2,6-dipheny phenylene ether) produced from 2,6-dipheny phenol.

A specific example of an aromatic diol residue represented in each of General Formulae (5) and (6) is the aromatic diol residue exemplified in General Formula (1) or (2).

Particularly, a polyarylene ether nitrile segment including bisphenol-A and 2,6-dihalo benzonitrile; and a polyarylene ether ketone segment including bisphenol-A and 4,4'-dihalo benzophenone are preferable because each of these segments can be produced easily and is high in heat resistance, moldability, and transparency.

The aromatic polyester segment preferably has a weight percentage of not less than 10 weight % but less than 90 weight % relative to 100 weight % of the block copolymer including an aromatic polyester segment and an aromatic polyether segment. If the weight percentage is less than 10 weight % or not less than 90 weight %, the dispersibility of the metal oxide particles may be low. Further, the aromatic polyester segment more preferably has a block copolymerization percentage of not less than 20 weight % but less than 80 weight % of the block copolymer.

The aromatic polyether segment to be included is preferably not less than 10 weight % but less than 90 weight % relative to 100 weight % of the block copolymer.

Each of the aromatic polyester segment and aromatic polyether segment in the block copolymer preferably has a chain length of not less than 500 but less than 20 000 in weight-average molecular weight. If the segment chain length is less than 500, synthesis of the block copolymer may be inefficient. If the segment chain length is not less than 20 000, the block copolymer may have a low optical property due to its microphase separation. The segment chain length is more preferably not less than 1000 but less than 16 000.

Each of the aromatic polyester segment and aromatic polyether segment in the block copolymer may be present in different kinds to be mixed. Further, other than the aromatic polyester segment and the aromatic polyether segment, a third segment such as an aromatic polycarbonate segment may be mixed to produce a block copolymer including three or more components. In this case, the third segment preferably has a weight percentage of not more than 40 weight % relative to 100 weight % of the block copolymer.

The block copolymer preferably has a weight-average molecular weight of not less than 5000 but not more than 500 000, or more preferably not less than 10 000 and not more than 200 000. If the molecular weight is less than 5000, a resulting polymer composite material may produce a molding which is low in strength. If the molecular weight is more than 500 000, a resulting polymer composite material may be high in viscosity and thus impede molding.

The block copolymer including an aromatic polyester segment and an aromatic polyether segment can be produced easily by a publicly known method. For example, an aromatic polyether oligomer having a hydroxyl group at an end is first synthesized. Then, an aromatic diol and an aromatic dicarboxylic acid are condensed with each other in the presence of the aromatic polyether oligomer to synthesize the block copolymer.

According to the above invention, the polymer composite material includes a thermoplastic aromatic polymer as a polymer matrix. This makes it possible to select, for a particular purpose, one from among a variety of generally used molding methods such as injection molding. This indicates that the moldability is improved and that the polymer composite material can thus be used in a wider variety of applications.

The above invention further enables production of a useful polymer composite material which includes metal oxide particles uniformly dispersed in a polymer matrix and which thus has a high transparency and a high refractive index.

According to the polymer composite material of the present invention, the metal oxide particles preferably include an oxide of at least one metal selected from the group consisting of Ti, Zr, Tl, Y, Nb, In, Bi, La, Sb, Sc, Pb, and Ta.

The metal oxide has a high refractive index. This facilitates preparation of metal oxide particles having a refractive index of not less thin 2.0. The metal oxide may be used solely or two or more of them may be used in combination, as appropriate.

The metal oxide particles may be produced by a publicly known production method such as hydrothermal synthesis and sol-gel process. In particular, the metal oxide particles are preferably produced by a method disclosed in Patent Literature 4 or Non Patent Literature 1, i.e., by hydrothermal reaction in water which is in a supercritical or subcritical state. At high temperature and high pressure, water in the supercritical or subcritical state is in the form of a nonpolar gas and thus provides a low-dielectric constant reaction field. In this reaction field, a metal oxide grows at an extremely high rate, and dissolved ions are present at an extremely low concentration. Consequently, secondary nucleation and excessive crystal growth are unlikely to occur, and particles to be produced will have small diameters.

The metal oxide particles have preferably been subjected to surface modification with use of a surface modifier. This surface modification improves hydrophobicity of the metal oxide particles and consequently allows the metal oxide particles to be suitably dispersed in the polymer matrix.

As specific examples, the surface modifier may be a phosphorus-containing surface modifier or a silicon-containing surface modifier. Some specific examples of the surface modifier are a phosphorus-containing surface modifier and a silicon-containing surface modifier. The phosphorus-containing surface modifier is phosphoric acid monoester, phosphoric acid diester, phosphonic acid monoester, or a salt of any of these. The silicon-containing surface modifier is preferably an alkoxysilane compound. The phosphorus-containing surface modifier and the silicon-containing surface modifier may be used in combination.

The metal oxide particles preferably have an average particle diameter of not less than 1 nm but less than 30 nm. If the average particle diameter is less than 1 nm, the polymer matrix may have a problem of, e.g., increased viscosity during the production of the polymer composite material. In addition, production of such minute metal oxide particles is currently difficult and thus will require a high production cost. If the average particle diameter is more than 30 nm, inherently large diameters of the metal oxide particles may cause a decrease in the transparency of the polymer composite material.

The metal oxide particles are preferably contained in an amount which is not less than 5 weight % but less than 90 weight %. If the metal oxide particles are contained in an amount which is less than 5 weight %, the metal oxide particles may fail to sufficiently improve properties of the polymer composite material. If the metal oxide particles are contained in an amount which is not less than 90 weight %, molding of the polymer composite material may be difficult.

According to the polymer composite material of the present invention, the thermoplastic aromatic polymer having both an ester bond and an ether bond is used as a polymer for the polymer matrix and is characterized by its capability to disperse the metal oxide. Thus, the combination of the amorphous and transparent matrix polymer with the metal oxide particles having a high refractive index enables production of an optical material including a polymer composite material, which optical material, as compared to conventional optical materials, has a high refractive index, is transparent, and is also high in, e.g., heat resistance and moldability. Examples of the optical material encompass a lens and an optical film. The optical material is, however, not particularly limited.

In a case where the polymer composite material has a shape of a film, a film made of the polymer composite material and having a thickness of not less than 30 μm preferably has a total luminous transmittance of not less than 75% and a haze of less than 20% for use as an optical material. The total luminous transmittance is more preferably not less than 80%.

The polymer matrix may include an additive such as a flame retardant, a stabilizing agent, a plasticizing agent, and a surface active agent, provided that such inclusion is not inconsistent with the object of the present invention.

EXAMPLES

The following describes the present invention in more detail with reference to examples. The present invention is, however, not limited to these examples.

In the examples described below, analysis was performed as below on (i) metal oxide particles obtained by hydrothermal reaction and (ii) metal oxide particles obtained by hydrothermal reaction and having been subjected to surface modification reaction.

<Average Particle Diameter of Metal Oxide Particles>

Under a transmission electron microscope, respective diameters of 100 particles were measured to determine a mean value thereof.

<Evaluation of Surface Modification Reaction of Metal Oxide Particles>

Dried powder of the metal oxide particles was analyzed by KBr method with Fourier transform infrared absorption (FT-IR) measuring device NEXUS 470 FT-IR (product name; manufactured by Nicolet Corporation).

The dried powder of the metal oxide particles was heated in an atmosphere at a rate of 10° C./min. When the dried powder was heated to 800° C., a weight loss in the dried powder was measured. The measurement was made with thermogravimetic-differential thermal analyzer (TG-DTA) Thermo plus TG 8120 (product name; manufactured by Rigaku Corporation).

In production examples described below, various polymers usable as the polymer matrix were each synthesized and evaluated as follows.

<Weight-Average Molecular Weight of Polymer>

With gel permeation chromatograph (GPC) HLC-8220GPC (product name; manufactured by Tosoh Corporation), a weight-average molecular weight (Mw) based on a polystyrene standard was measured with use of chloroform as developing solvent.

<Method for Producing Polymer Composite Material Film>

A polymer composite material was dissolved in dichloromethane at a concentration in a range from 10 to 25 weight %. This solution was cast with a bar coater on a glass plate to have a thickness in a range from 300 to 400 μm, and was allowed to settle at room temperature for 1 hour. A film formed was then stripped off and dried at room temperature for 3 hours. The film was further dried in a vacuum at 40° C. for 1 hour. As a result, a film having a thickness in a range from 30 to 80 μm was produced.

<Refractive Index of Polymer Composite Material>

A measurement was made in compliance with JIS K 7142. With sulfur methylene iodide used as a contact liquid, a refractive index (nD) for a wavelength of 589 nm was measured with use of DR-M4 multiwavelength abbe refractometer (product name; manufactured by Atago Co., Ltd.).

<Total Luminous Transmittance (TT) and Haze (HZ) of Polymer Composite Material>

A measurement was made in compliance with JIS K 7361. As a turbidimeter, NDH2000 turbidimeter (product name; manufactured by Nippon Denshoku Industries Co., Ltd.) was used.

<Content of Metal Oxide Particles>

With use of the above TG-DTA, a temperature of the polymer composite material obtained was raised in the atmosphere at a rate of 10° C./min to reach 800° C., and a content of the metal oxide particles was then measured on the basis of a weight of a remainder. This content indicates a content of the metal oxide particles without organic matter derived from a surface modifier.

Production Example 1

Example Production of Organosol Including Barium Titanate Particles Dispersed in Dichloromethane In a flow type reactor, (i) aqueous solution in which titania sol (manufactured by Ishihara Sangyo Kaisha, Ltd.; product number STS100) was diluted to a Ti concentration of 0.05 M and (ii) aqueous solution including 0.06 M of barium hydroxide were flowed each at a flow rate of 8 ml/min together with supercritical water flowed at 44 ml/min so that (i), (ii), and the supercritical water were mixed. Hydrothermal synthesis was thus performed at a reaction temperature of 400° C. under a reaction pressure of 30 MPa for a detention time of 7.8 milliseconds. The systhesized product was washed with ion-exchange water, and an aqueous dispersion including $BaTiO_3$ particles at a concentration of 6.3 w/v % was produced. An X-ray diffraction pattern of dried powder of the $BaTiO_3$ particles coincided with that of tetragonal $BaTiO_3$ having a refractive index of 2.4. An average particle diameter of obtained $TiO_2$ particles was 14 nm.

Next, 6 ml of the above aqueous dispersion was introduced in a centrifuging tube and subjected to centrifugation. A resulting sediment was ultrasonically dispersed in 12 ml of acetone, which was then subjected to centrifugation. A resulting sediment was ultrasonically dispersed in 12 ml of ethanol. Further, 0.12 ml of phosphoric acid-2-ethylhexyl ester (mono- and di-ester mixture; hereinafter referred to as "PAEH" as appropriate) was added to the ethanol, which was then subjected to an ultrasonic treatment at 40° C. for 20 minutes so that a surface modification reaction was performed. The ethanol was then subjected to centrifugation. A resulting sediment was ultrasonically dispersed in 8 ml of dichloromethane, which was then subjected to centrifugation so that a sediment was removed. Next, a supernatant fluid of the dichloromethane was recovered. As a result, an opalescent organosol including $BaTiO_3$ particles dispersed in dichloromethane was obtained.

A portion of the organosol thus obtained was dried off and then weighed so that a concentration of the surface-modified $BaTiO_3$ particles in the organosol was determined. The concentration was 2.4 w/v %. In this organosol, no agglomerated sediment was formed even after one month. The organosol thus maintained a stable sol state.

A FT-IR spectrum of the dried product of the organosol was measured. As a result, a peak for an alkyl group in the PAEH was detected. The dried product was heated to 800° C. in the atmosphere. As a result, a 15 weight % loss was observed.

Production Example 2

Example Production of Randomly Copolymerized Polyalylates

The following describes an example production of randomly copolymerized polyalylates.

Under nitrogen atmosphere, 0.6 g of NaOH was charged in a flask and 20 ml of ion-exchange water was added so that NaOH was dissolved in the ion-exchange water. To this solution, 0.680 g of bisphenol-A(Bis-A), 0.400 g of 4,4'-dihydroxy dipheny ether (DHPE), 0.025 g of 4-cumylphenol (molecular weight regulator), and 10 mg of cetyltrimethylammonium chloride (phase transfer catalyst) were added and dissolved. While a resulting solution was stirred in an ice bath, 28 ml of dichloromethane in which 1.015 g of an equimolar mixture of terephthalic acid dichloride and isophthalic acid dichloride was dissolved was added to the solution. Next, this solution was stirred for 4 hours, and acetic acid was added to the solution to end a reaction. A dichloromethane phase was washed with water and then put into a large amount of methanol so that a polymer was recovered. The polymer was dried to produce a randomly copolymerized polyalylate (polymer A) in which a molar ratio for Bis-A and DHPE was 60:40.

In manners similar to the above, (i) randomly copolymerized polyalylates (polymers B and C) in which molar ratios for Bis-A and DHPE were 80:20 and 90:10, respectively, and (ii) a polyalylate (polymer D) including only Bis-A were synthesized. Further, a randomly copolymerized polyalylate (polymer E) including Bis-A and bis(4-hydroxyphenyl)sulfide (DHPS) at a molar ratio of 60:40 was produced. Each of the polymers A through E thus produced was soluble in dichloromethane, and a transparent and colorless film could be produced from each polymer.

Table 1 shows a weight-average molecular weight (Mw), film thickness, refractive index (nD), total luminous transmittance (TT), and haze (HZ) of each polymer produced.

TABLE 1

| POLYMER | MOLAR RATIO OF DIOL MONOMERS | $Mw/10^4$ | THICKNESS/μm | $n_D$ | TT/% | HZ/% |
|---|---|---|---|---|---|---|
| A | Bis-A:DHPE = 60:40 | 8.2 | 50 | 1.622 | 89 | 1 |
| B | Bis-A:DHPE = 80:20 | 11.2 | 50 | 1.616 | 89 | 6 |
| C | Bis-A:DHPE = 90:10 | 14.1 | 40 | 1.614 | 88 | 6 |
| D | Only Bis-A | 18.3 | 45 | 1.613 | 89 | 1 |
| E | Bis-A:DHPS = 60:40 | 12.2 | 50 | 1.635 | 89 | 3 |

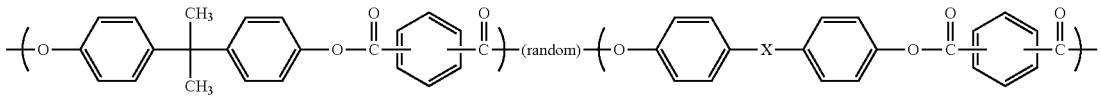

Production Example 3

Example Production of Polycarbonate-Based Copolymers

The following describes an example production of polycarbonate-based copolymers.

In a manner similar to that of Production Example 2, DHPE, phenylphosphoro dichloride, and 2,2-bis(4-chloroformyl oxyphenyl)propane were reacted with one another at a ratio of 10:5:5, so that a polyphosphonate/polycarbonate random copolymer (polymer F) was produced.

[POLYMER F]

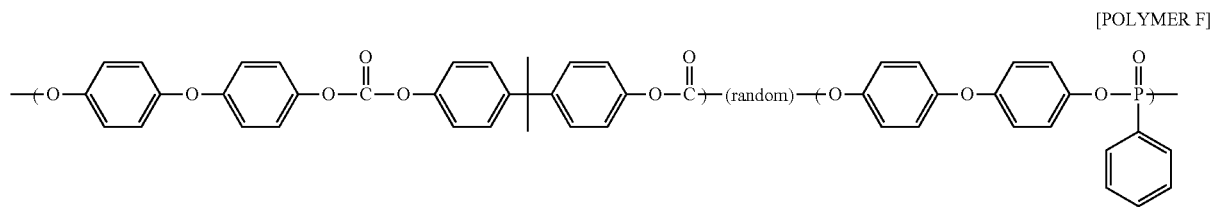

Similarly, DHPE and 2,2-bis(4-chloroformyl oxyphenyl) propane were reacted with each other at a ratio of 1:1, so that a polycarbonate copolymer (polymer G) was produced.

[POLYMER G]

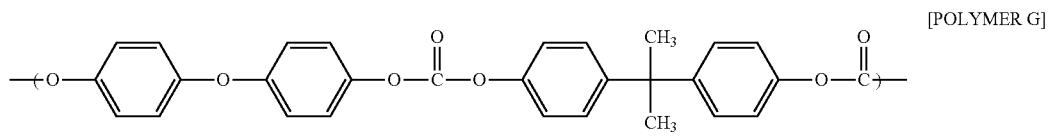

Table 2 shows a weight-average molecular weight (Mw), film thickness, refractive index ($n_D$), total luminous transmittance (TT), and haze (HZ) of each polymer produced.

TABLE 2

| POLYMER | POLYMER STRUCTURE | Mw/ $10^4$ | THICK-NESS/ μm | $n_D$ | TT/ % | HZ/ % |
|---|---|---|---|---|---|---|
| F | Polyphosphonate/ Carbonate | 6.0 | 60 | 1.602 | 89 | 2 |
| G | Polycarbonate Copolymer | 18.0 | 30 | 1.593 | 89 | 2 |

Examples 1 Through 5 and Comparative Examples 1 Through 3

Each of the polymers A through G produced in Production Examples 2 and 3 was dissolved in the dichloromethane organosol which was produced in Production Example 1 and which included BaTiO₃ particles. Next, the organosol was dried and then dissolved in dichloromethane again so that a polymer composite material film was produced. Table 3 shows a kind of each polymer used and a result of evaluating a film thickness, content (particle percentage) of the metal oxide particles, refractive index (nD), total luminous transmittance (TT), and haze (HZ) of each film produced.

TABLE 3

| | POLYMER | THICKNESS/ μm | PARTICLE PERCENTAGE/ wt % | $n_D$ | TT/ % | HZ/ % |
|---|---|---|---|---|---|---|
| EXAMPLE 1 | A | 35 | 59 | 1.758 | 84 | 6 |
| EXAMPLE 2 | A | 40 | 37 | 1.692 | 85 | 4 |
| EXAMPLE 3 | B | 35 | 31 | 1.664 | 86 | 4 |
| COMPARATIVE EXAMPLE 1 | C | 40 | 39 | (Unmeasurable) | 53 | 91 |
| COMPARATIVE EXAMPLE 2 | D | 50 | 33 | (Unmeasurable) | 67 | 87 |
| EXAMPLE 4 | E | 35 | 38 | 1.743 | 85 | 9 |
| EXAMPLE 5 | F | 30 | 37 | 1.668 | 85 | 3 |
| COMPARATIVE EXAMPLE 3 | G | 30 | 33 | (Unmeasurable) | 57 | 90 |

The results in Table 3 clearly indicate the following: According to Comparative Example 2, in which as a polymer matrix, the so-called polyalylate (polymer D) was used which included only bisphenol-A as an aromatic diol component and which had only an ester bond component, a produced polymer composite material merely included poorly dispersed BaTiO₃ particles and was thus low in transparency. In contrast, according to Examples 1 through 3, in each of which as a polymer matrix, the randomly copolymerized polyalylate (polymer A or B) was used which included, as an aromatic diol component, 40 mol % or 20 mol % of DHPE having an ether bond, the dispersibility of the particles was significantly higher.

More specifically, each of the polymer composite material films, at a particle percentage of not less than 30 weight % and a thickness of not less than 30 μm, exhibited a high total luminous transmittance of not less than 75% and a low haze value of not more than 20%. This indicates that using, as a polymer matrix, a thermoplastic aromatic polymer having both an ether bond and an ester bond can dramatically improve the dispersibility of the metal oxide particles.

Even the film of Example 1, which film had a particle content of not less than 50%, exhibited a high transparency. This demonstrates that it is possible to produce a polymer composite material which has a high refractive index and a high moldability.

According to Comparative Example 1, in which the randomly copolymerized polyalylate (polymer C) including 10 mol % of DHPE was used as a polymer matrix, the polymer composite material film included poorly dispersed particles and thus had a low transmittance. To achieve a sufficient dispersibility, a copolymerization percentage of not less than 20 mol % was necessary.

Further, according to Example 4, in which the randomly copolymerized polyalylate (polymer E) including 40 mol % of DHPS having a thioether bond was used as a polymer matrix, the polymer composite material film, at a particle percentage of not less than 30 weight % and a thickness of not less than 30 μm, exhibited a high total luminous transmittance of not less than 75% and a low haze value of not more than 20%. This indicates that a thioether bond as well as an ether bond has an effect of improving the dispersibility of the metal oxide particles.

According to Comparative Example 3, in which the polycarbonate (polymer G) copolymerized with DHPE having an ether bond was used as a polymer matrix, the dispersibility was poor at a particle percentage of not less than 30 weight %. In contrast, according to Example 5, in which the polyphosphonate/carbonate copolymer (polymer F) having a phenylphosphonic acid diester bond introduced therein was used as a polymer matrix, the polymer composite material film, at a particle percentage of not less than 30 weight % and a thickness of not less than 30 μm, exhibited a high total luminous transmittance of not less than 75% and a low haze value of not more than 20%. This indicates that a phenylphosphonic acid diester bond as well as a carboxylic acid ester bond has an effect of improving the dispersibility of the metal oxide particles.

Production Example 4

Example Production of Polyether

The following describes an example production of polyethers.

Bis-A and 4,4'-difluorobenzophenone (DFBP) were reacted with each other at a ratio of 5:4 in N,N-dimethyl acetamide at a temperature of not lower than 150° C. in the presence of potassium carbonate in an equimolar or greater amount with respect to Bis-A. As a result, a hydroxyl-terminated poloyarylene ether ketone oligomer (OE1) was synthesized. In a manner similar to the above, either Bis-A or 2,2-bis(4-hydroxy-3,5-dimethyl phenyl)propane (TMBA) and 2,6-difluorobenzonitrile (DFBN) were reacted with each other at a ratio of 8:7 to produce a hydroxyl-terminated polyarylene ether nitrile oligomer (OE2 and OE3).

Further, Bis-A and DFBP were reacted with each other at an equimolar ratio to produce a high-molecular-weight polyarylene ether ketone (polymer H). Either Bis-A or TMBA and DFBN were reacted with each other at an equimolar ratio to produce a high-molecular-weight polyarylene ether nitrile (polymers I and J). Each of the polymers H through J produced was soluble in dichloromethane, and a transparent and colorless film was produced from each polymer.

In addition, 5 g of poly(2,6-dimethyl phenylene ether) manufactured by Sigma-Aldrich Corporation and 0.569 g of TMBA were dissolved in toluene. Under nitrogen atmosphere, 0.2 g of benzoyl peroxide was added to the mixture, which was then stirred at 90° C. for 4 hours. As a result, a hydroxyl-terminated poly(2,6-dimethyl phenylene ether)oligomer (OE4) was produced. The following shows a weight-average molecular weight and chemical structure of each of OE1 through OE4.

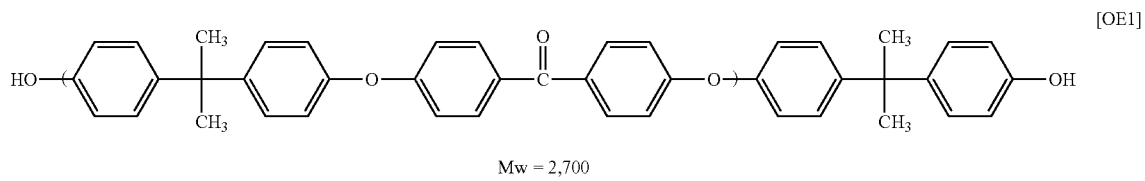

[OE1]

Mw = 2,700

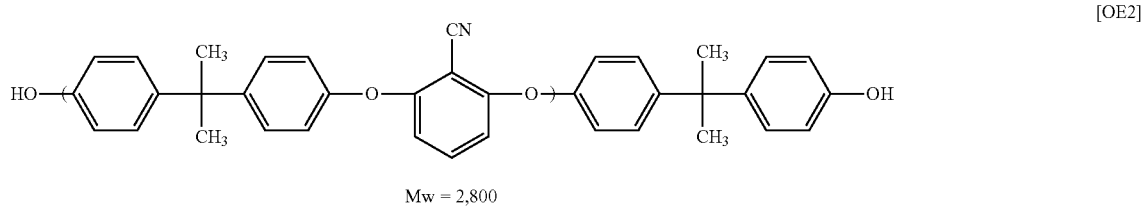

[OE2]

Mw = 2,800

-continued

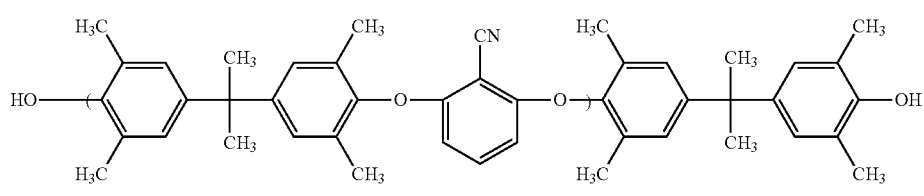
Mw = 15,700 [OE3]

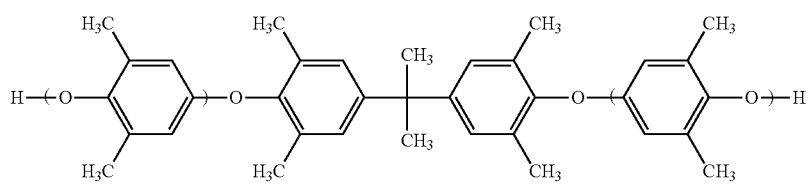
Mw = 12,000 [OE4]

Production Example 5

Example Production of Polyalylate/Polyether Block Copolymer

The following describes an example production of polyalylate/polyether block copolymers.

Under nitrogen atmosphere, 0.44 g of NaOH was introduced in a flask and 12 ml of ion-exchange water was added so that NaOH was dissolved in the ion-exchange water. To this solution, 1.062 g of Bis-A and 10 mg of cetyltrimethylammonium chloride (phase transfer catalyst) were added and dissolved. Further, a solution of 0.486 g of OE1 in 6 ml of dichloromethane was added to the solution. While a resulting solution was stirred in an ice bath, 6 ml of dichloromethane in which 1.015 g of an equimolar mixture of terephthalic acid dichloride and isophthalic acid dichloride was dissolved was added to the solution. Next, this solution was stirred for 4 hours, and acetic acid was added to the solution to end a reaction. A dichloromethane phase was washed with water and then put into a large amount of methanol so that a polymer was recovered. The polymer was dried to produce a block copolymer (polymer K) including a polyarylene ether ketone segment and a polyalylate segment at a weight ratio of 20:80.

In manners similar to the above, block copolymers (polymers L through Q) including various polyether oligomers at different segment weight ratios were produced. Each of the block copolymers thus produced was soluble in dichloromethane, and a transparent and colorless film was produced from each block copolymer.

Table 4 shows block chemical structures, segment weight ratios, weight-average molecular weights, refractive indexes, total luminous transmittances, and hazes of the block polymers.

TABLE 4

| POLYMER | ETHER SEGMENT | ETHER/ESTER SEGMENT WEIGHT RATIO | Mw/$10^4$ | THICKNESS/μm | $n_D$ | TT/% | HZ/% |
|---|---|---|---|---|---|---|---|
| H | (OE1) | 100/0 | 12.7 | 60 | 1.648 | 87 | 13 |
| I | (OE2) | 100/0 | 27.6 | 45 | 1.627 | 89 | 1 |
| J | (OE3) | 100/0 | 31.3 | 50 | 1.584 | 89 | 1 |
| K | OE1 | 20/80 | 11.3 | 50 | 1.621 | 88 | 5 |
| L | OE1 | 50/50 | 10.1 | 75 | 1.630 | 89 | 6 |
| M | OE2 | 20/80 | 9.6 | 45 | 1.621 | 89 | 3 |
| N | OE2 | 50/50 | 13.2 | 45 | 1.620 | 89 | 2 |
| O | OE2 | 80/20 | 4.7 | 70 | 1.621 | 88 | 5 |
| P | OE3 | 20/80 | 5.4 | 65 | 1.599 | 88 | 2 |
| Q | OE4 | 20/80 | 9.7 | 50 | 1.604 | 89 | 2 |

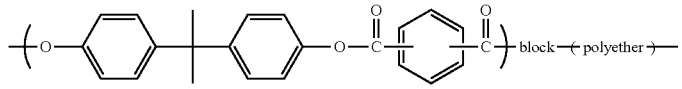

Examples 6 Through 9 and Comparative Examples 4 and 5

Each of the following examples is of a polymer composite material including a block copolymer having a polyarylene ether ketone (OE1) structure as a polyether segment.

Each of the polymers H, K, and L produced in Production Examples 4 and 5 was dissolved in the dichloromethane organosol which was produced in Production Example 1 and which included $BaTiO_3$ particles. Next, the organosol was dried and then dissolved in dichloromethane again so that a polymer composite material film was produced. Table 5 shows a kind of each polymer used and a result of evaluating a thickness, particle percentage, refractive index, total luminous transmittance, and haze of each polymer.

TABLE 5

| | POLYMER | THICKNESS/ μm | PARTICLE PERCENTAGE/ wt % | $n_D$ | TT/ % | HZ/ % |
|---|---|---|---|---|---|---|
| COMPARATIVE EXAMPLE 4 | H | 60 | 56 | (Unmeasurable) | 52 | 91 |
| COMPARATIVE EXAMPLE 5 | H | 50 | 35 | (Unmeasurable) | 55 | 91 |
| EXAMPLE 6 | K | 65 | 52 | 1.731 | 79 | 18 |
| EXAMPLE 7 | K | 40 | 41 | 1.700 | 84 | 6 |
| EXAMPLE 8 | L | 50 | 51 | 1.726 | 79 | 13 |
| EXAMPLE 9 | L | 60 | 30 | 1.677 | 78 | 17 |

The results in Table 5 clearly indicate the following: According to Comparative Examples 4 and 5, in each of which as a polymer matrix, the polyarylene ether ketone (polymer H) was used which included only bisphenol-A as an aromatic diol component and which had no ester bond component, a produced polymer composite material merely included poorly dispersed $BaTiO_3$ particles and was thus low in transparency. In contrast, according to Examples 5 through 8, in each of which as a polymer matrix, the block copolymer (polymer K or L) including a polyether segment and a polyester segment was used, the dispersibility of the particles was significantly higher.

More specifically, each of the polymer composite material films, at a particle percentage of not less than 30 weight % and a thickness of not less than 30 μm, exhibited a high total luminous transmittance of not less than 75% and a low haze value of not more than 20%. This indicates that using, as a polymer matrix, a thermoplastic aromatic polymer having both an ether bond and an ester bond can dramatically improve the dispersibility of the metal oxide particles.

Examples 10 through 17 and Comparative Examples 6 Through 9

Each of the following examples is of a polymer composite material including a block copolymer having a polyarylene ether nitrile (OE2 or OE3) structure as a polyether segment. Each of the polymers I, J, M, N, O, and P produced in Production Examples 4 and 5 was dissolved in the dichloromethane organosol which was produced in Production Example 1 and which included $BaTiO_3$ particles. Next, the organosol was dried and then dissolved in dichloromethane again so that a polymer composite material film was produced. Table 6 shows a kind of each polymer used and a result of evaluating a thickness, particle percentage, refractive index, total luminous transmittance, and haze of each polymer.

TABLE 6

| | POLYMER | THICKNESS/ μm | PARTICLE PERCENTAGE/ wt % | $n_D$ | TT/ % | HZ/ % |
|---|---|---|---|---|---|---|
| COMPARATIVE EXAMPLE 6 | I | 55 | 56 | (Unmeasurable) | 50 | 91 |
| COMPARATIVE EXAMPLE 7 | I | 45 | 33 | (Unmeasurable) | 61 | 91 |
| EXAMPLE 10 | M | 35 | 53 | 1.724 | 83 | 19 |
| EXAMPLE 11 | M | 35 | 44 | 1.700 | 85 | 4 |
| EXAMPLE 12 | N | 45 | 49 | 1.706 | 83 | 10 |
| EXAMPLE 13 | N | 45 | 33 | 1.664 | 84 | 18 |
| EXAMPLE 14 | O | 45 | 57 | 1.746 | 83 | 10 |
| EXAMPLE 15 | O | 65 | 33 | 1.683 | 84 | 6 |
| COMPARATIVE EXAMPLE 8 | J | 55 | 55 | (Unmeasurable) | 48 | 91 |
| COMPARATIVE EXAMPLE 9 | J | 45 | 33 | (Unmeasurable) | 57 | 90 |
| EXAMPLE 16 | P | 65 | 51 | 1.715 | 82 | 8 |
| EXAMPLE 17 | P | 60 | 33 | 1.665 | 84 | 5 |

The results in Table 6 clearly indicate the following: According to Comparative Examples 6 through 9, in each of which as a polymer matrix, the polyarylene ether nitrile (polymer I or J) was used which included only Bis-A or TMBA as an aromatic diol component and which had no ester bond component, a produced polymer composite material merely included poorly dispersed $BaTiO_3$ particles and was thus low in transparency. In contrast, according to Examples 10 through 17, in each of which as a polymer matrix, the block copolymer (polymer M, N, O, or P) including a polyether segment and a polyester segment was used, the dispersibility of the particles was significantly higher.

More specifically, each of the polymer composite material films, at a particle percentage of not less than 30 weight % and a thickness of not less than 30 μm, exhibited a high total luminous transmittance of not less than 75% and a low haze value of not more than 20%. This indicates that using, as a polymer matrix, a thermoplastic aromatic polymer having both an ether bond and an ester bond can dramatically improve the dispersibility of the metal oxide particles.

Examples 18 and 19

Each of the following examples is of a polymer composite material including a block copolymer having a poly(2,6-dimethyl phenylene ether) (OE4) structure as a polyether segment.

The polymer Q produced in Production Example 5 was dissolved in the dichloromethane organosol which was produced in Production Example 1 and which included $BaTiO_3$ particles. Next, the organosol was dried and then dissolved in dichloromethane again so that a polymer composite material film was produced. Table 7 shows a kind of the polymer used and a result of evaluating a thickness, particle percentage, refractive index, total luminous transmittance, and haze of the polymer.

TABLE 7

| | POLYMER | THICKNESS/ μm | PARTICLE PERCENTAGE/ wt % | $n_D$ | TT/% | HZ/% |
|---|---|---|---|---|---|---|
| EXAMPLE 18 | Q | 40 | 55 | 1.716 | 84 | 4 |
| EXAMPLE 19 | Q | 45 | 41 | 1.679 | 85 | 4 |

The results in Table 7 clearly show the following: According to Examples 18 and 19, in each of which as a polymer matrix, the block copolymer (polymer Q) including (i) a polyether segment having a poly(2,6-dimethyl phenylene ether) skeleton and (ii) a polyester segment, each of the polymer composite material films, at a particle percentage of not less than 30 weight % and a thickness of not less than 30 μm, exhibited a high total luminous transmittance of not less than 75% and a low haze value of not more than 20%. This indicates that using, as a polymer matrix, a thermoplastic aromatic polymer having both an ether bond and an ester bond can dramatically improve the dispersibility of the metal oxide particles.

The present invention is not limited to the above embodiment and can thus be altered in various ways within the scope of the present invention.

Industrial Applicability

The polymer composite material of the present invention is easy to process and is also high in transparency. The polymer composite material is thus applicable to an optical material, an electronic material, a coating material, a gas barrier material, and a photocatalyst. In particular, the polymer composite material is suitably applicable to an optical material.

The invention claimed is:

1. A polymer composite material, comprising:
    a polymer matrix including a thermoplastic aromatic polymer having both an ester bond and an ether bond; and metal oxide particles dispersed in the polymer matrix;
    wherein the thermoplastic aromatic polymer comprises:
        a repeating unit having a (thio)ether bond and represented by General Formula (1) below; and
        a repeating unit having no (thio)ether bond and represented by General Formula (2) below; and
    wherein a percentage N, calculated from Equation 1 below, of the repeating unit represented by General Formula (1) is not less than 20 mol % but less than 60 mol %, $$N = n_1/(n_1+n_2) \times 100, \quad \text{(Equation 1)}$$

where $n_1$ is the number of moles in the repeating unit represented by General Formula (1); and $n_2$ is the number of moles in the repeating unit represented by General Formula (2),

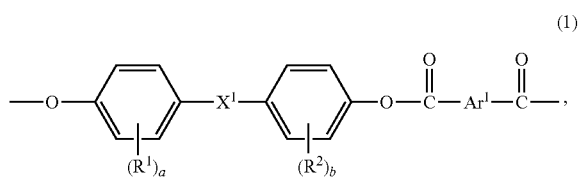

(1)

-continued

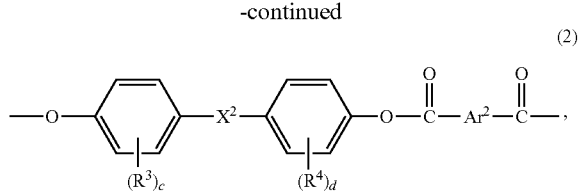

(2)

where $R^1$, $R^2$, $R^3$, and $R^4$ are independently a halogen atom, a C1 to C6 alkyl group, or a C6 to C12 aryl group, and may be identical to or different from one another; a, b, c, and d are independently an interger(s) of 0 to 4; $X^1$ is an oxygen atom or a sulfur atom; $X^2$ is a single bond, a C1 to C6 alkylene group, a C1 to C6 alkylidene group, a C5 to C20 cycloalkylene group, a C5 to C20 cycloalkylidene group, a 9,9-flouroenylidene group, a hexoflouro-2,2-propylidene group, —SO—, —$SO_2$—, or —CO—; and $Ar^1$ and $Ar^2$ are independently a phenylene group, naphthalene group, or biphenylene group, and are substituted or unsubstituted.

2. The polymer composite material according to claim 1, wherein the metal oxide particles include an oxide of at least one metal selected from the group consisting of Ti, Zr, Tl, Y, Nb, In, Bi, La, Sb, Sc, Pb, and Ta.

3. The polymer composite material according to claim 1, wherein the metal oxide particles have an average particle diameter of not less than 1 nm but less than 30 nm.

4. The polymer composite material according to claim 1, wherein the metal oxide particles are contained in an amount which is not less than 5 weight % but less than 90 weight %.

5. The polymer composite material according to claim 1, wherein when the polymer composite material is formed into a film having a thickness of not less than 30 μm, the film has a total luminous transmittance of not less than 75% and a haze of less than 20%.

6. An optical material comprising a polymer composite material recited in claim 1.

7. The polymer composite material according to claim 1, wherein:
    the thermoplastic aromatic polymer is a block copolymer including an aromatic polyester segment and an aromatic polyether segment;

the aromatic polyester segment is not less than 10 weight % but less than 90 weight % relative to 100 weight % of the block copolymer; and the aromatic polyether segment is not less than 10 weight % but less than 90 weight % relative to 100 weight % of the block copolymer.

8. The polymer composite material according to claim 7, wherein the aromatic polyester segment includes an aromatic polyester represented by the following General Formula (3):

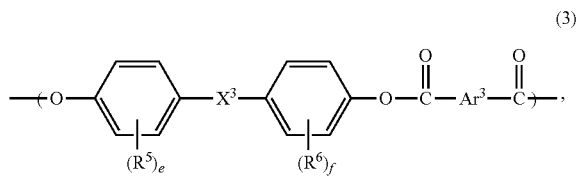

(3)

where $R^5$ and $R^6$ are independently a halogen atom, a C1 to C6 alkyl group, or a C6 to C12 aryl group, and may be identical to or different from one another; e and f are independently an integer(s) of 0 to 4; $X^3$ is a single bond, a C1 to C6 alkylene group, a C1 to C6 alkylidene group, a C5 to C20 cycloalkylene group, a C5 to C20 cycloalkylidene group, a 9,9-fluorenylidene group, a hexafluoro-2,2-propylidene group, —O—, —S—, —SO—, —SO$_2$—, or —CO—; and $Ar^3$ is a phenylene group, naphthylene group, or biphenylene group, and is substituted or unsubstituted.

9. The polymer composite material according to claim 7, wherein the aromatic polyether segment is an aromatic polyether represented by the following General Formula (4):

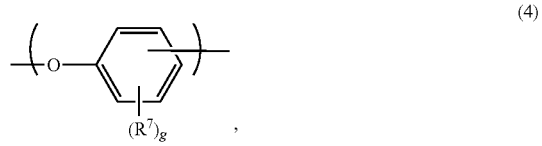

(4)

where $R^7$ is a halogen atom, a C1 to C6 alkyl group, or a C6 to C12 aryl group, and may be identical to or different from each other; and g is an integer of 0 to 4.

10. The polymer composite material according to claim 7, wherein the aromatic polyether segment is an aromatic polyether represented by the following General Formula (5):

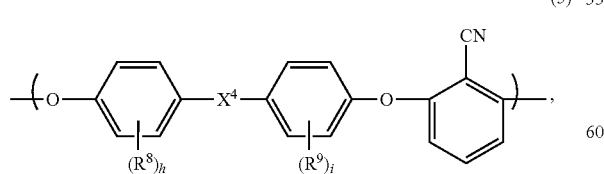

(5)

where $R^8$ and $R^9$ are independently a halogen atom, a C1 to C6 alkyl group, or a C6 to C12 aryl group, and may be identical to or different from one another; h and i are independently an integer(s) of 0 to 4; and $X^4$ is a single bond, a C1 to C6 alkylene group, a C1 to C6 alkylidene group, a C5 to C20 cycloalkylene group, a C5 to C20 cycloalkylidene group, a 9,9-fluorenylidene group, a hexafluoro-2,2-propylidene group, —O—, —S—, —SO—, —SO$_2$—, or —CO—.

11. The polymer composite material according to claim 7, wherein the aromatic polyether segment is an aromatic polyether represented by the following General Formula (6):

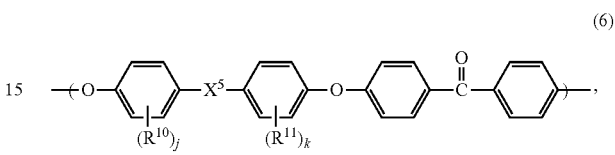

(6)

where $R^{10}$ and $R^{11}$ are independently a halogen atom, a C1 to C6 alkyl group, or a C6 to C12 aryl group, and may be identical to or different from one another; k and j are independently an integer(s) of 0 to 4; and $X^5$ is a single bond, a C1 to C6 alkylene group, a C1 to C6 alkylidene group, a C5 to C20 cycloalkylene group, a C5 to C20 cycloalkylidene group, a 9,9-fluorenylidene group, a hexafluoro-2,2-propylidene group, —O—, —S—, —SO—, —SO$_2$—, or —CO—.

12. A thermoplastic aromatic polymer comprising both an ester bond and an ether bond, wherein said thermoplastic aromatic polymer comprises a repeating unit having a (thio)ether bond and represented by General Formula (1) below; and a repeating unit having no (thio)ether bond and represented by General Formula (2) below;

wherein a percentage N, calculated from Equation 1 below, of the repeating unit represented by General Formula (1) is not less than 20 mol % but less than 60 mol %, $$N = n_1/(n_1+n_2) \times 100 \quad \text{(Equation 1)}$$

where $n_1$ is the number of moles in the repeating unit represented by General Formula (1); and $n_2$ is the number of moles in the repeating unit represented by General Formula (2),

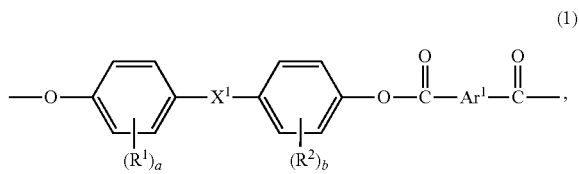

(1)

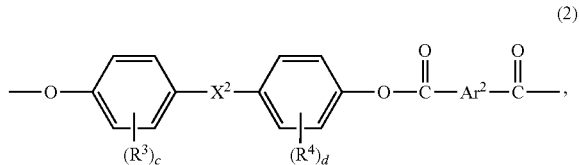

(2)

where $R^1$, $R^2$, $R^3$, and $R^4$ are independently a halogen atom, a C1 to C6 alkyl group, or a C6 to C12 aryl group, and may be identical to or different from one another; a, b, c, and d are independently an integer(s) of 0 to 4; $X^1$ is an oxygen atom or a sulfur atom; $X^2$ is a single bond, a C1 to C6 alkylene group, a C1 to C6 alkylidene group, C5 to C20 cycloalkylene group, a C5 to C20 cycloalkylidene group, a 9,9-flourenylidene group, a hexaflouro-2,2-propylidene group, —SO—, —SO$_2$—, or —CO—; and $Ar^1$ and $Ar^2$ are independently a phenylene group, naphthylene group, or biphenylene group, and are substituted or unsubstituted.

* * * * *

UNITED STATES PATENT AND TRADEMARK OFFICE
CERTIFICATE OF CORRECTION

PATENT NO. : 8,367,757 B2
APPLICATION NO. : 12/812841
DATED : February 5, 2013
INVENTOR(S) : Yusuke Imai et al.

Page 1 of 1

It is certified that error appears in the above-identified patent and that said Letters Patent is hereby corrected as shown below:

On the Title Page, Item (73), Assignee should read as follows:

"National Institute of Advanced Industrial Science and Technology"

Signed and Sealed this
Nineteenth Day of November, 2013

Teresa Stanek Rea
*Deputy Director of the United States Patent and Trademark Office*